Figure 5:
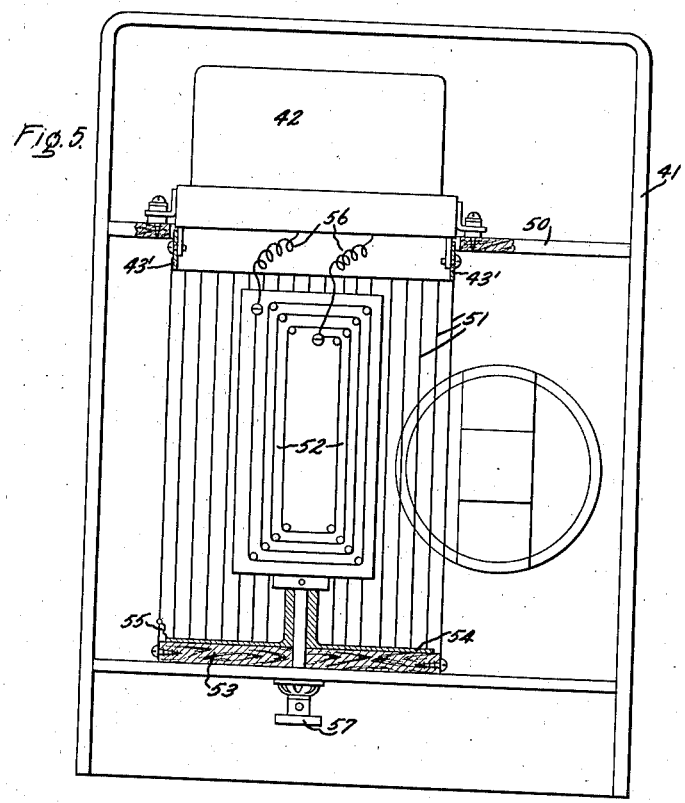

June 4, 1940.                J. E. BEGGS                2,203,517
                            RADIO RECEIVER
                         Filed May 28, 1938           2 Sheets-Sheet 1
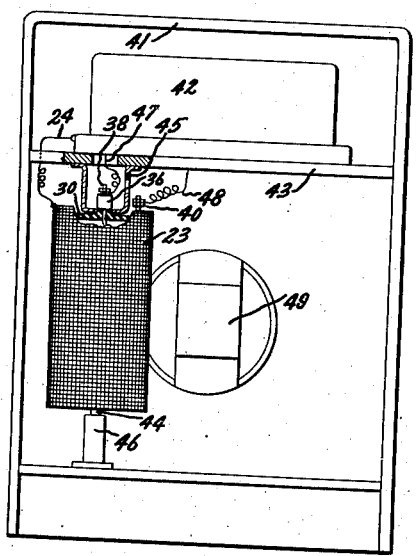
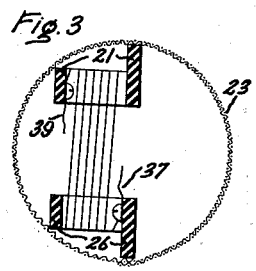
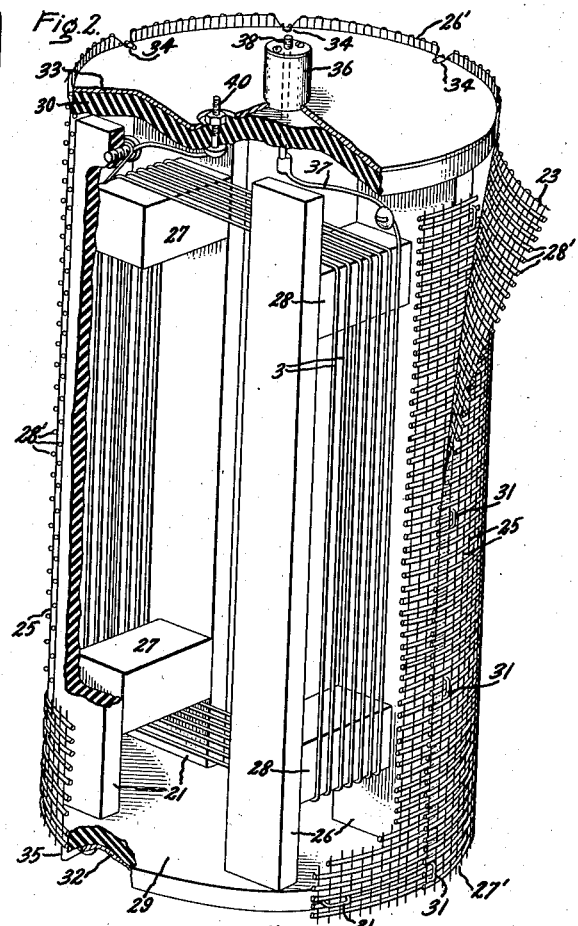
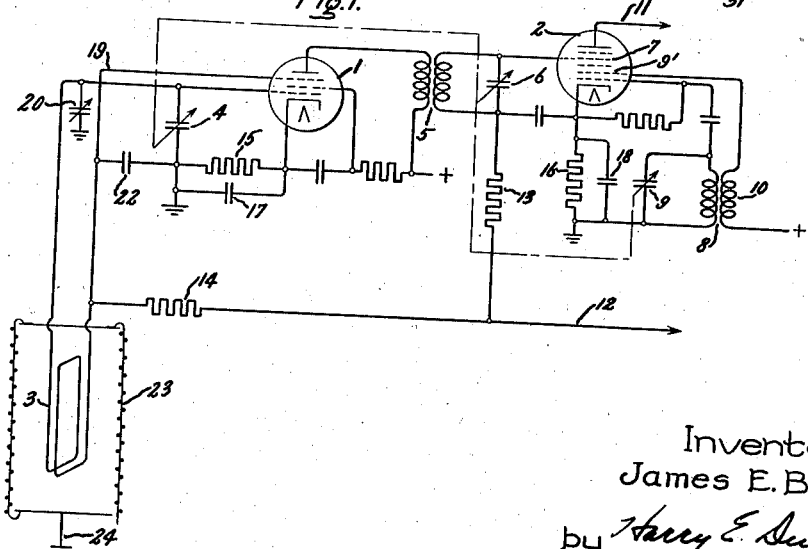
Inventor:
James E. Beggs,
by Harry E. Dunham
His Attorney.

June 4, 1940.   J. E. BEGGS   2,203,517
RADIO RECEIVER
Filed May 28, 1938   2 Sheets-Sheet 2

Inventor:
James E Beggs
by Harry E. Dunham
His Attorney.

Patented June 4, 1940

2,203,517

UNITED STATES PATENT OFFICE 2,203,517

RADIO RECEIVER

James E. Beggs, Schenectady, N. Y., assignor to General Electric Company, a corporation of New York Application May 28, 1938, Serial No. 210,673

11 Claims. (Cl. 250—20)

My invention relates to radio receivers and more particularly to receivers employing loop antennae. It has for one of its objects to provide such a receiver which is capable of improved signal reception with reduced reception of noise currents.

Radio receivers utilizing loop antennae were at one time commonly employed. Their desirability as a means for eliminating the necessity for an external antenna have, of course, long been recognized. Their use, however, has been almost completely discontinued for a number of years except in special types of receivers such as direction finders and the like.

Probably one reason for the discontinuance of the use of the loop in ordinary household receivers resides in the fact that the response of the loop antenna to transmitted radio waves is weak as compared with the response of the usual outdoor vertical aerial. In addition, the directional properties of the usual unbalanced loop is not such as to offer material advantages with respect to the avoidance of undesired currents. The balanced loop, on the other hand, was directional in its response but it presented such difficulties with respect to alignment of the loop circuit with the other tuned circuits of the receiver that its use was not practical in multistage or superheterodyne receivers.

In accordance with my invention the usual unbalanced loop is employed, this loop being electrostatically shielded to prevent reception of energy from the surrounding electric fields and to confine such reception to the magnetic fields. In this way the unbalanced loop acquires the directional properties of the balanced loop in that it possesses a substantially figure of eight field pattern, all non-directional, or so-called antenna effects upon the loop being substantially eliminated. The loop may then be oriented for minimum reception of noise and at the same time provide adequate response to signals from directions other than that from which the undesired noise currents arrive.

The principal noise currents to be eliminated are of the so-called man made character, originating in local electrical machinery and appliances, automobiles, etc., and they usually arrive at any particular location from a predominant direction. In addition, they appear to be principally in the nature of electric fields rather than magnetic fields. Accordingly, by use of the shield and by properly orienting the loop the noise currents may be largely eliminated Of course, the shield about the loop, also has the effect of reducing the response of the loop to desired currents but the extreme sensitivity of modern day receivers employing present high amplification screen grid tubes is such that the response of such a shielded loop is wholly adequate. In fact it has been found that very desirable reception by use of the loop may be had in fields of noise currents so intense as entirely to prevent any desirable reception with receivers employing the usual vertical antenna.

Shielded loops have been commonly employed in recent years in special types of receivers such as direction finders where the receiver is not tunable by unicontrol means, or is not tunable over a wide frequency band such as the broadcast band, for example. Such special types of receivers have generally employed loops in which the conductor of the loop is encased in a conducting pipe, which extends in the form of the loop, the electric circuit through the conducting pipe being broken by insulation at one point of the loop. As distinct from such a construction the advantages of my invention result, in part, from housing the loop form bodily within the shield, and otherwise, as will presently be described, so arranging the loop and shield structure as to secure the results which it is the object of my invention to obtain. The resulting structure is simple and economical to manufacture and assemble in receivers for ordinary household use and is highly commercial in such application.

Figure 6:
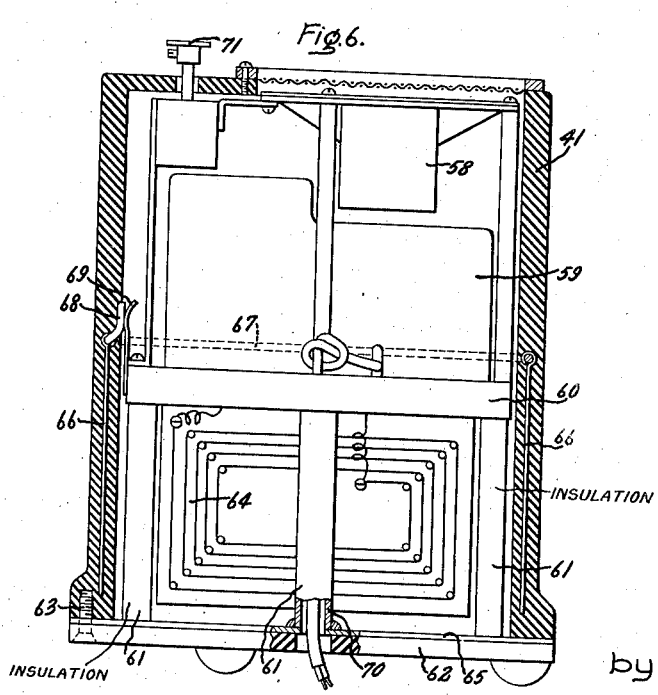

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 represents schematically a radio receiver embodying my invention; Fig. 2 represents in detail the loop and shield structure embodied therein; Fig. 3 represents a section of Fig. 2, Fig. 4 shows a loop and shield, constructed in accordance with my invention, incorporated in a household radio cabinet, and Figs. 5 and 6 show modifications of my invention.

Referring to Fig. 1 of the drawings I have shown therein a schematic diagram of the first two stages of a conventional broadcast radio receiver, this receiver employing a radio frequency amplifier comprising an electron discharge device 1, and a converter stage comprising a multigrid electron discharge device 2. The loop antenna is shown at 3, connected between the control grid and cathode of the discharge device 1 across the usual tuning condenser 4. The amplified oscillations in the output of discharge device 1 are supplied through transformer 5 to a tuned circuit comprising the secondary winding of this transformer and tuning condenser 6, this tuned circuit being connected between the control grid 7 of discharge device 2 and the cathode thereof.

The discharged device 2 is represented as one of the pentagrid converter type the two grids nearest the cathode being employed in connection with the cathode to generate oscillations. For this purpose the grid nearest the cathode is connected to the cathode through the usual grid condenser and tuned circuit comprising inductance 8 and tuning condenser 9. The grid 9' next farther removed from the cathode is connected thereto through an inductance 10 and a source of operating potential which in the drawings is indicated by a plus sign adjacent the terminal of inductance 10. Inductances 8 and 10 are coupled together to provide the necessary regeneration to sustain oscillations.

The circuit 8, 9 is of course, tuned in the conventional manner to the frequency of oscillations to be produced and in present day receivers is usually tuned to a frequency of about 465 kilocycles higher than the signals to be received, or in the broadcast band, above 550 to 1500 or more kilocycles. This tuning of the circuit 8, 9 with respect to the input circuits 3, 4, and 5, 6 of discharge devices 1 and 2 respectively is maintained by the conventional unicontrol condenser arrangement whereby condensers 4, 6 and 9 are varied in capacity simultaneously. Oscillations of the intermediate frequency, which result in discharge device 2 from combining the local oscillations with oscillations of the received frequency are supplied through conductor 11 and ground to subsequent stages of the receiver, which may include intermediate frequency amplifiers tuned to the intermediate frequency, a detector and audio amplifiers, as desired.

If automatic volume control means be required the unidirectional potential for operation thereof may be supplied through conductor 12 and resistances 13 and 14 to the grids of respective discharge devices 1 and 2. This potential may also be supplied through conductor 19 to the suppressor grid of discharge device 1.

Normal bias voltage for discharge devices 1 and 2 is provided by cathode bias resistors 15 and 16 respectively, which are by-passed by respective condensers 17 and 18.

Incorporated in the circuit of the loop 3 is the usual trimmer condenser 20 which is effectively in shunt with condenser 4 and additional by-pass condenser.

The loop 3 is housed within a shield 23 which is grounded at 24 and the structure of which may be better understood by reference to Fig. 2.

In Fig. 2 I have shown the loop 3 as comprising a plurality of turns of conductor wound upon a suitable wooden form comprising uprights 21 and 26, these uprights being respectively spaced apart by spacing and supporting members 27 and 28. Additional spacing members (not shown) may, of course, be employed to space the uprights 27 from the uprights 28. If desired, such spacing may be effected by means of the end disks 29 and 30 which may likewise be of wood or other suitable non-conducting material and which serve to support the shield 23.

The shield 23 comprises a series of parallel vertical conductors 25 which are connected together at one point along the length thereof which, in the drawings, is indicated at 26' at the top ends of the conductors. The lower ends of these vertical conductors are disconnected from each other and electrically insulated therefrom as shown at 27'. These vertical conductors 25 may desirably be woven together with non-conducting strands 28' to form a fabric, the non-conducting strands being of cotton, woolen or other suitable yarn or cord. This fabric is then wrapped about the circumference of the two disks 29 and 30 to form a cylinder enclosing the loop structure and being of sufficient length desirably that the ends overlap sufficiently to complete the cylindrical surface and to be attached to the loop form by means of staples as indicated at 31. The shield is completed by means of conducting disks or sheets of metal 32 and 33 placed upon the disks 29 and 30 respectively. The upper ends of the conducting strands of the shield fabric are soldered to the conductor 33 as indicated at points 34 so that this fabric becomes substantially electrically continuous with the end shield 33. The lower conducting disk 32 is preferably electrically disconnected from the fabric except through a single strand thereof as indicated at 35 whereby it is connected to the upper conducting end surface 33. This electrical discontinuity between the lower ends of the conducting strands of the shield and between these ends and the lower end shield 32 prevents the production of eddy currents in the shield while at the same time maintaining the property of the shield to protect the loop from external electric fields.

Preferably the loop should be mounted for rotation. For this purpose the upper end disk 30, 33 of the loop form is provided with a bearing 36 which may be utilized in rotatably mounting the loop. A similar bearing may of course be provided on the lower end disk 29. One of the terminals 37 of the loop may desirably be brought out through the center of this bearing 36 as through the conductor 38, the other terminal of the loop being brought out through the terminal connection indicated at 40.

In Fig. 3 I have shown a horizontal section through the loop form of Fig. 2. It will be seen that the loop form is mounted within the cylinder formed by the shield, substantially wholly at one side of a diameter thereof, whereby the plane of one of the end turns of the loop coil falls substantially upon a diameter of the loop. The turns are then wound about the form from this point at progressively reduced distances from the shield. The end 39 of the outer turn may then be connected through connection 40 for example, to ground. In this way, the high potential portion of the loop is spaced a substantial distance from the shield whereas the grounded or low potential end of the loop is relatively close to the shield. This construction aids in reducing the capacity effect of the shield upon the loop and serves very materially in reducing the effect of the shield upon the frequency characteristics of the loop and upon the sharpness thereof with respect to directivity. Of course, other modes of construction of the loop may be employed to secure these ends as by winding the turns of the conductor concentrically in a single plane with the high potential turns within the low potential turns. I prefer, however, the construction illustrated.

In Fig. 4 I have shown the loop shield 23 wrapped about the form upon which it is supported and mounted within the cabinet 41 of an ordinary household radio receiver of the console type. The radio chassis of the receiver is conventionally indicated at 42 within the cabinet 41 and is mounted upon a shelf 43 of the cabinet. The shield 23 is mounted beneath the shelf by means of the end bearings 36 and 44 which may be supported in stationary bearing members 45 and 46 respectively. Preferably the bearing member 45 may be a conductor grounded to the chassis of the receiver thereby to shield the connection 47 which extends from the bolt 38 to the radio receiver, this connection extending upward through the shelf 43 into the chassis of the receiver. The low potential end of the shield may be connected through conductor 48 to equipment on the chassis of the receiver, as shown in Fig. 1. The connection 24 for the shield may be made between the chassis and a suitable point on the shield.

At the right of the shield 23 is shown the usual loud speaker 49 of the receiver. The dimensions of the loop and shield may be sufficiently small to go into the loud speaker compartment of the ordinary console model receiver, as shown, and still be of sufficient dimensions to accomplish satisfactorily all of the practical results to be secured by my invention.

In the use of the invention the radio cabinet is positioned in the home as desired and the loop and shield are then rotated in the bearing members 45 and 46 to a position such that noise reception is at a minimum. In this position it is left during the operation of the receiver. Of course, if the position of the receiver be later changed a new orientation of the loop is made. It will be found, of course, that reception of signals from the direction of the null of the loop is eliminated equally with the noise currents. The null of the loop, however, extends over a very narrow angle as, for example, something of the order of five, or less, degrees and it is infrequent that a desired broadcasting station lies within that direction. If one does so lie, any reception therefrom with the ordinary receiver, would of course, be noisy. Reception from stations in other directions is greatly improved by reason of the reduction of the noise which is secured by use of the loop and shield.

It has been found that the alignment of the circuits of condensers 4, 6, and 9 is not more difficult by reason of the loop than is the case where an ordinary vertical antenna is employed. The loop coil 3 may be designed to have characteristics substantially the same as that of the secondary transformer coil commonly used in the input circuits of radio receivers with vertical antenna. In addition, manufacturing variations in the loops may be compensated for by means of the trimmer condenser 20.

In Fig. 5 I have shown a modified form of my invention in which the radio chassis 42 of the receiver is suitably mounted upon a shelf 50, within the cabinet 41. This chassis 42 is provided with a conducting ring 43' which extends about its outer periphery and projects through the shelf 50. To this ring is attached a number of vertical conductors 51 comprising a shield, these conductors extending vertically downward and being spaced apart and insulated from each other at the bottom thereby forming an enclosure within which the loop 52 is mounted. These vertical conductors may be held in place by means of member 53 to which the lower ends are attached. The enclosure is completed by means of a metallic surface member, or plate 54, positioned on the upper surface of the member 53 and conductively connected at 55 to one of the vertical conductors 51. In this way it will be seen that the loop is completely housed by the shield, the vertical members 51 being conductively attached to the chassis which forms the upper closure member for the shield.

The loop 52 is shown as having its conductors all wound in a single plane as in the pancake type of coil but, of course, any suitable form of loop may be employed. The terminals of the loop extend through conductors 56 to apparatus mounted upon the chassis.

Rotation of the loop may be effected by means of a handle 57 in the lower portion of the cabinet which is attached to support 57 upon which the loop is mounted.

Fig. 6 represents a further embodiment of my invention in which the cabinet 41 may be of the table model type having a loud speaker 58 mounted in the top thereof and arranged to project the sound waves upward. Within the cabinet 41 is the radio chassis 59 mounted upon and conductively connected to a conducting shelf 60 which is supported upon columns 61 from the floor, or baseplate 62, of the cabinet. The cabinet 41, which may be of moulded material is attached to the floor or baseplate 62 by means of screws 63.

The loop of the receiver is indicated at 64 as being of the pancake type and is supported below the shelf 60 and between the columns, or supports 61. The shelf 60, or the chassis mounted thereon, being of conducting material, forms the upper shield for the loop. The baseplate is provided with an upper metallic surface 65 which may be of sheet copper and which forms a lower shield for the loop. The side walls of the shield may comprise conductors extending between the shelf 60 and the surface 65 as, for example, around the side walls of the cabinet, as in the form of a skirt. I have shown such conductors, or skirt, at 66 moulded within the side walls of the cabinet although, of course, it will be understood that this is merely illustrative and that these conductors may be mounted in any wise upon the side walls of the cabinet. They are, of course, connected together at the upper ends as indicated by the conductor 67, and insulated from each other throughout other portions of their length. They are grounded to the chassis 60 by means of a sliding connection indicated by members 68 and 69, the former being connected to conductors 66 and mounted on the inner surface of the cabinet and the other being connected to the conducting shelf 60 and mounted for engagement with the conductor 68 when the chassis is in place within the cabinet.

The supports 61 are of non-conducting material with the exception of a single one of them which may comprise a conducting pipe as indicated at 70, the lower end of which is welded to the plate 65 and the upper end of which is welded to the plate 60 thereby conductively to connect all portions of the shield. It will be seen that as so arranged, upon removal of screws 63 and control knob 71 that the cabinet may be lifted upward and completely removed from the receiver, the chassis, loop and loud speaker remaining as a unitary assembly. The shield, since it is mounted upon the cabinet is, of course, removed therewith. In this case it is unnecessary that the loop be rotatable since the entire cabinet may be rotated to effect the desired orientation for minimum noise. Since the sound is projected upwardly it may be heard uniformly in all directions and such orientation does not therefore impair audibility in any particular direction.

While I have shown a particular embodiment of my invention, it will, of course, be understood that I do not wish to be limited thereto since different modifications may be made both in the structure shown and in the circuit illustrated. I contemplate by the appended claims to cover any such modifications as fall within the true spirit and scope of my invention.

What I claim as new and desire to secure by Letters Patent of the United States, is:

1. In combination, a radio receiver comprising a pair of variably tuned circuits, unicontrol means to vary the tuning of said circuits over a wide band of frequencies, one of said circuits comprising a directional receiving antenna of loop form arranged for orientation in a direction of minimum reception of undesired currents, and means further to reduce the reception of said undesired currents, said means comprising a shielding housing bodily enclosing said loop form and electrostatically shielding said loop antenna, said shielding housing having stranded conducting side walls extending between conducting end walls and said loop comprising a solenoid having a high potential terminal near a plane substantially bisecting said housing and turns extending at successively increasing distances from said plane toward said side walls, whereby said higher potential portions of said loop are more remote from said side walls than the lower potential portions of said loop, thereby to reduce the effect of said shielding housing upon the capacitance of said loop, whereby the response of said loop antenna is substantially confined to electromagnetic fields in space, and said unicontrol means is effective to vary the tuning of said circuits by like amounts throughout said wide band of frequencies.

2. In combination, a radio receiver comprising a pair of variably tuned circuits, unicontrol means to vary the tuning of said circuits over a band of frequencies extending over a range of approximately 500 to 1500 kilocycles, one of said circuits including an antenna of loop form arranged for orientation in a direction of minimum reception of undesired currents, and a shield bodily enclosing said loop form and electrostatically shielding said loop antenna whereby the response of said lop antenna is substantially confined to electromagnetic fields in space, said loop comprising a solenoid having its higher potential end turn positioned near the center plane of said shield and its opposite end turn positioned nearer said shield whereby the higher potential portions of said loop are positioned at increasing distances from said shield and the effect of said shield on the capacity of said loop is reduced.

3. In combination, a radio receiver comprising a pair of variably tuned circuits, unicontrol means to vary the tuning of each of said circuits over a wide band of frequencies, one of said circuits comprising a directional receiving antenna of loop form arranged for orientation in a direction of minimum reception of undesired currents, and means further to reduce the reception of said undesired currents, said means comprising a shielding housing bodily enclosing said loop form, said loop being wound upon a non-conducting form within said housing, the side walls of said housing comprising parallel conductors conductingly joined at one end and insulated from each other at the other end thereby to shield said loop from electrostatic fields in space and to confine the response of the loop to electromagnetic fields.

4. In combination, a housing comprising end portions of conducting material and side walls joining said end portions, said side walls comprising insulated conductors conductively joined together only at one point in the length thereof, whereby the interior of said housing is electrostatically shielded from space, and a loop antenna within said housing, the response of said loop antenna being confined by said housing to electromagnetic fields in space, said loop being wound upon a form having a lateral portion supporting said end walls apart to form said housing, said housing being arranged for rotation with said loop.

5. In combination, a housing comprising end portions of conducting material and side walls joining said end portions, said side walls comprising insulated conductors conductively joined together only at one point in the length thereof, and a loop antenna within said housing, one terminal of said loop being grounded and the other terminal thereof being connected to a radio receiver, the successive portions of said loop from said grounded terminal to said other terminal being spaced within and at successively increasing distances from said housing.

6. The combination, in a radio receiver having a cabinet, of a radio shield within said cabinet, said shield having stranded conducting side walls, extending between conducting end walls of the shield thereby completing a housing, a loop arranged within said housing, a connection extending from said loop through said housing to the signal input circuit of said receiver, and means to rotate said housing and loop to a position of minimum noise reception, said shield being effective to confine the response of said loop to electromagnetic radiation, thereby additionally reducing said noise reception.

7. The combination, in a radio receiver having a cabinet, of a radio shield within said cabinet, said shield having stranded conducting side walls, extending between conducting end walls of the shield thereby completing a housing, a loop arranged within said housing, a connection extending from said loop through said housing to the signal input circuit of said receiver, and a shield about said connection whereby the response of said loop is substantially confined to electromagnetic radiation.

8. In combination, a radio receiver cabinet having a metallic chassis mounted therein, an electrostatic shield extending from said chassis and a loop antenna mounted within said shield and shielded in part by said shield and in part by said chassis.

9. In combination, a radio receiver cabinet having a metallic chassis mounted therein, an electrostatic shield extending from said chassis and a loop antenna mounted within said shield and shielded in part by said shield and in part by said chassis, and means to rotate said loop within said shield.

10. In a radio receiver cabinet having a receiver chassis mounted therein, a loop antenna arranged within said cabinet at one side of said chassis, and a shield extending from the outer portions of said chassis away therefrom and surrounding said loop whereby said loop is shielded by said loop and chassis.

11. In a radio receiver cabinet having a receiver chassis mounted therein, a loop antenna arranged within said cabinet at one side of said chassis, and a shield extending from the outer portions of said chassis away therefrom and surrounding said loop whereby said loop is shielded by said loop and chassis, said shield being attached to the walls of said cabinet.

JAMES E. BEGGS.